United States Patent
Klöckner

(10) Patent No.: US 9,127,416 B2
(45) Date of Patent: Sep. 8, 2015

(54) WORK TRAIN COMPRISING A SILO TRAILER DRAWN BY A GROUND MILLING MACHINE, AND TOWING DEVICE FOR SAID WORK TRAIN

(71) Applicant: BOMAG GmbH, Boppard (DE)

(72) Inventor: Stefan Klöckner, Niederwerth (DE)

(73) Assignee: BOMAG GmbH, Boppard (DE)

( * ) Notice: Subject to any disclaimer, the term of this patent is extended or adjusted under 35 U.S.C. 154(b) by 0 days.

(21) Appl. No.: 14/219,567

(22) Filed: Mar. 19, 2014

(65) Prior Publication Data

US 2014/0286706 A1    Sep. 25, 2014

(30) Foreign Application Priority Data

Mar. 21, 2013    (DE) .......................... 10 2013 004 948

(51) Int. Cl.
| | |
|---|---|
| *E01C 23/088* | (2006.01) |
| *E01C 23/06* | (2006.01) |
| *B60D 1/62* | (2006.01) |
| *E01C 21/00* | (2006.01) |
| *B60D 5/00* | (2006.01) |

(52) U.S. Cl.
CPC .............. *E01C 23/065* (2013.01); *B60D 1/62* (2013.01); *B60D 5/00* (2013.01); *E01C 21/00* (2013.01)

(58) Field of Classification Search
CPC ......... E01C 21/00; E01C 23/065; B60D 1/62; B60D 5/00
USPC ...................................... 404/90, 92; 299/39.4
See application file for complete search history.

(56) References Cited

U.S. PATENT DOCUMENTS

| | | | |
|---|---|---|---|
| 3,732,023 A | 5/1973 | Rank et al. | |
| 4,129,398 A | * 12/1978 | Schoelkopf | .................... 404/95 |
| 5,741,085 A | * 4/1998 | Wirtgen | ......................... 404/75 |

(Continued)

FOREIGN PATENT DOCUMENTS

| | | |
|---|---|---|
| DE | 20 2008 012 104 U1 | 3/2010 |
| DE | 10 2009 008 884 A1 | 8/2010 |
| EP | 0 260 260 B1 | 12/1991 |

OTHER PUBLICATIONS

Lang & Tomerius, English Machine Translation of Claim 1 of German Patent Application No. DE 20 2008 012 104 U1 Mar. 2014 (1 page).

Espacenet, English Machine Translation of German Application No. DE202008012104U1, dated Feb. 11, 2010, retrieved from http://worldwide.espacenet.com on Mar. 18, 2014 (15 pages).

(Continued)

*Primary Examiner* — Raymond W Addie

(74) *Attorney, Agent, or Firm* — Wood, Herron & Evans, LLP

(57) ABSTRACT

The present invention relates to a work train for milling an underlying ground surface and intermixing bulk material with the milled ground material, comprising a self-propelled ground milling machine, more particularly, a recycler or a stabilizer, comprising a milling drum mounted in a hood and a drive motor, a silo trailer drawn by the ground milling machine and comprising a storage container for bulk material, a conveying system, which transports bulk material during operation of the work train from the silo trailer to in front of the milling drum, as regarded in the direction of travel (a) of the ground milling machine, and an output means, which discharges the bulk material onto the ground in front of the milling drum, as regarded in the direction of travel (a). The present invention further relates to a towing device for such a work train.

21 Claims, 4 Drawing Sheets

(56) References Cited

U.S. PATENT DOCUMENTS

| | | | |
|---|---|---|---|
| 6,050,743 A * | 4/2000 | Medinger | 404/90 |
| 6,416,249 B1 * | 7/2002 | Crupi | 404/91 |
| 2010/0209189 A1 | 8/2010 | Menzenbach et al. | |
| 2013/0216308 A1 * | 8/2013 | Weaver | 404/75 |

OTHER PUBLICATIONS

Espacenet, English Machine Translation of German Application No. DE102009008884A1, dated Aug. 26, 2010, retrieved from http://worldwide.espacenet.com on Mar. 18, 2014 (15 pages).

German Patent Office, German Search Report, Application No. 10 2013 004 948.2, dated Jan. 16, 2014 (3 pages).

* cited by examiner

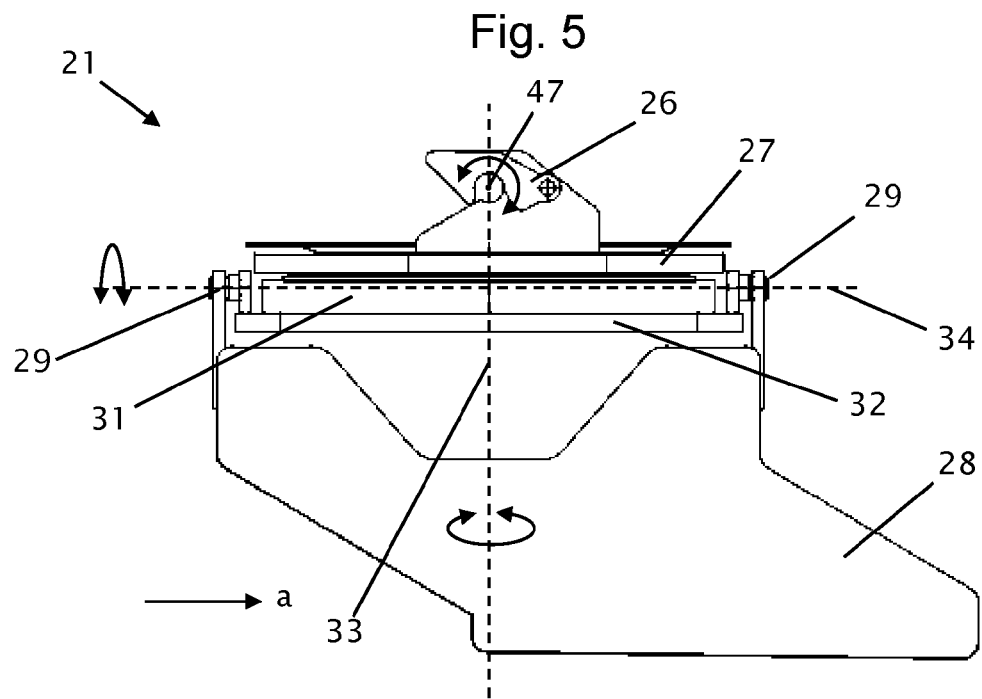
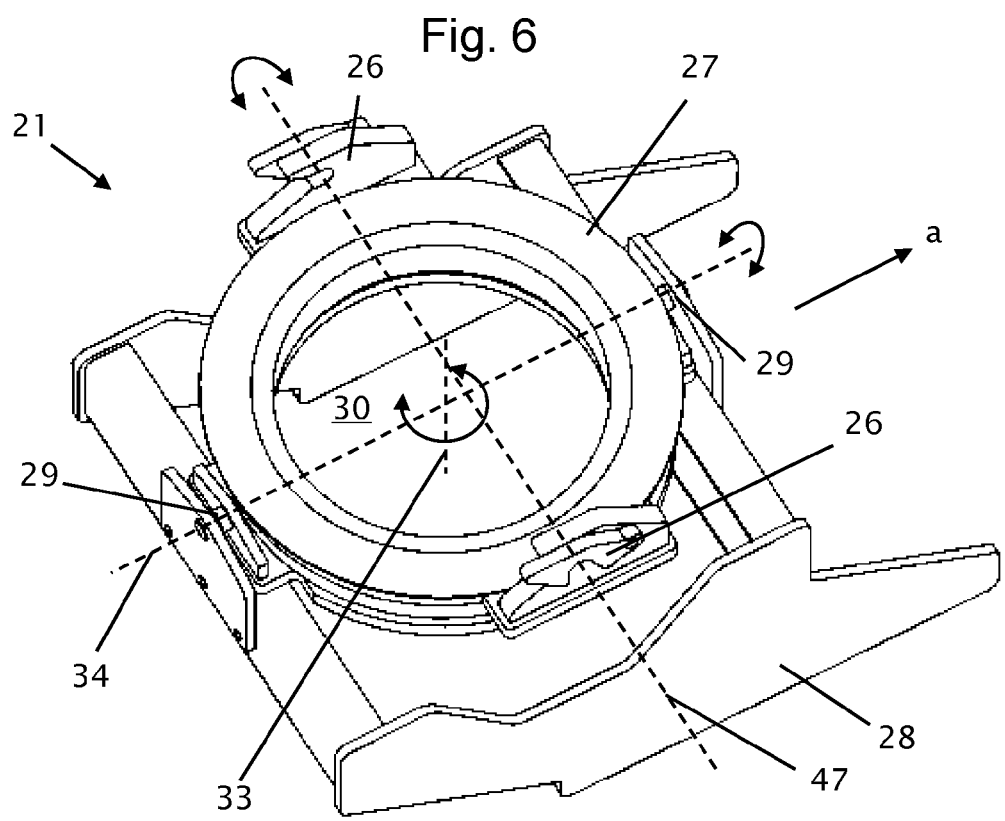

WORK TRAIN COMPRISING A SILO TRAILER DRAWN BY A GROUND MILLING MACHINE, AND TOWING DEVICE FOR SAID WORK TRAIN

CROSS-REFERENCE TO RELATED APPLICATION

The present application claims priority under 35 U.S.C. §119 of German Patent Application No. 10 2013 004 948.2, filed Mar. 21, 2013, the disclosure of which is hereby incorporated herein by reference in its entirety.

FIELD OF THE INVENTION

The present invention relates to a work train comprising a self-propelled ground milling machine, more particularly, a recycler or a stabilizer, and a silo trailer comprising a storage container for bulk material, which trailer is drawn by the ground milling machine. Work trains of this kind are used regularly in the construction of roads and paths. They enable milling, crushing, and mixing of the underlying ground surface with the bulk material. The present invention further relates to a towing device for such a work train.

BACKGROUND OF THE INVENTION

In the construction of roads and paths, the existing soil is frequently used to produce a new base course therefrom, which is particularly suitable for the application of a new surface layer (paved layer). The existing soil is milled and crushed by ground milling machines and in most cases blended with a bonding agent, which can be bulk material (for example, lime, cement or fly ash). A base course is then prepared, for example, by compression of the bound milled material. Such ground milling machines are, in particular, recyclers or stabilizers, so that the following disclosure of the present invention relates more particularly to a recycler or a stabilizer with the described features, although, for the sake of clarity, these two machine types will not be explicitly referred to as preferred embodiments throughout.

Milling of the underlying ground surface and mixing of the bulk material into the milled soil are frequently carried out by means of a self-propelled ground milling machine, which usually includes a drive motor, for example, an internal combustion engine, a machine frame, an operator's platform, traveling means, such as wheels or crawlers, and a milling drum, more particularly, one mounted in a milling drum hood. The milling drum is a substantially hollow cylindrical body, on the external surface of which a number of milling tools are disposed, which, during operation of the ground milling machine, are driven, due to rotation of the milling drum, into the underlying ground surface to mill the same. At the same time, there is carried out crushing of the milled material and mixing of the milled material with the bulk material present on the soil surface. In order to ensure thorough mixing of the bulk material with the milled soil, the bulk material is deposited on the soil to be milled prior to milling by the milling drum, for example, by means of a spreading vehicle traveling ahead thereof.

The variant with a spreading vehicle driving ahead suffers from the economic and ecological drawback that undesirable losses frequently occur due to wind scatter. The first solutions proposed for this problem are disclosed in DE 20 2008 012 104 U1, which describes a work train by means of which a silo truck ahead deposits the bulk material directly in front of the ground milling machine in an area covered, for example, with dust shield mats. Thus, it relates to a work train comprising two self-propelled machines, both of which need a driver. Alternatively, it is known to design the ground milling machine with its own appropriate spreading system, as described in DE 10 2009 008 884 A1. The ground milling machine disclosed in this citation has its own silo or its own storage container, from which the bulk material is poured out in front of the milling drum. Practical experience, however, has shown that the bin capacity of the accompanied silo is too low, so that only comparatively short work periods are possible. Furthermore, it is known to transport bulk material pneumatically, while traveling, from a silo truck ahead to the ground milling machine, so as to increase the bin capacity for bulk material in this way. However, this approach is relatively complicated and, particularly because of the pneumatic conveying system, it is also relatively expensive to operate and maintain.

It is, thus, an object of the present invention to provide a work train for mixing bulk material into the underlying ground surface, by means of which the problems relating to the prior art are avoided and economic and dust-free dumping of bulk material onto the ground surface is made possible.

SUMMARY OF THE INVENTION

The solution involving a work train for milling the ground surface and intermixing the bulk material with the milled soil is achieved according to one aspect of the present invention with a self-propelled ground milling machine, more particularly, a recycler or a stabilizer, and with a silo trailer which is coupled to the ground milling machine and is drawn by the latter. It is a feature of the present invention that the transfer of bulk material takes place from the silo trailer to the ground milling machine with the help of a mechanical transporting or conveying system, more particularly, by means of a screw conveyor or a belt conveyer, which is less expensive and more reliable than pneumatic conveying or transporting systems. The mechanical conveying system outside the storage container is configured for the transport of the bulk material outside the storage container of the silo trailer. It is not to be confused with any further conveying system which may be located inside the silo trailer, that is to say inside its storage container, for transporting bulk material within the storage container, for example, towards a discharge opening or silo outlet. According to one embodiment of the present invention, the mechanical conveying system arranged outside the storage container comprises a first mechanical conveyor device and a second mechanical conveyor device. Thus, on the one hand, a substantially larger bin capacity can be made available and, on the other, the overall system can be designed economically for maintenance and operation.

The ground milling machine is the driving and operative unit in the present work train. The ground milling machine comprises a milling drum disposed in a working compartment, for example, in a milling drum hood open to the underlying ground surface, which milling drum is adapted for rotation horizontally and transversely to the direction of travel, a drive motor, by means of which the driving power necessary for traveling and/or driving the milling drum is provided, and traveling means, with the assistance of which the ground milling machine travels over the ground surface self-propelled, that is to say, under its own power. The ground milling machine according to the present invention further comprises an output or discharge device, by means of which bulk material, more particularly, a binding agent, can be distributed over the underlying ground surface by the ground milling machine. Further, provision may be made for a buffer, i.e., an intermediate silo and/or metering equipment to be connected, as regarded in the conveying direction of the bulk material, upstream of the discharge device, as is already known in the prior art in this field of application, for example, in spreading vehicles.

A further element of the work train according to one embodiment of the present invention is a silo trailer drawn by the ground milling machine and, when regarded in the direction of travel of the work train, disposed to the rear of the ground milling machine. The purpose of the silo trailer lies substantially in storing a large volume of bulk material, for example, to the order of 10 cubic meters and more, and in transferring bulk material to the ground milling machine at the desired rate. Thus, besides being a storage container for bulk material, the silo trailer includes at least one mechanical conveying system, which transfers the bulk material during operation of the work train from the silo trailer to the ground milling machine. This does not refer to conveying systems, or transport systems, that are provided solely within the storage container, for example, for the transport of bulk material, as for example, scraper floors or similar facilities typically provided in these vehicles. While these are also basically referred to as mechanical conveying systems, they are not present outside the storage container. Thus, as opposed to such conveying or transport systems which are located inside the storage container, the at least one mechanical conveying system transferring bulk material from the silo trailer to the ground milling machine during working operation of the work train is located outside the storage container. It is a feature that the actual transfer of the bulk material from the silo trailer to the ground milling machine takes place during operation of the traveling work train with the aid of the first mechanical conveyor device located outside the storage container, so that no kind of pneumatic transfer occurs at this point. A further feature is that the present invention also provides for a spreading vehicle or a silo truck comprising such a storage container, drawn by the ground milling machine during operation. However, the present invention also provides for such vehicles, which can basically be self-propelled, to be used for operating the work train in that they are coupled to the ground milling machine and drawn by the latter.

The first and the second said mechanical conveyor devices are arranged in series, that is, one behind the other in the direction of transportation of the bulk material from the silo trailer to the ground milling machine, the first conveyor device being assigned to the silo truck and the second conveyor device to the ground milling machine. The first mechanical conveyor device unloads bulk material onto the second mechanical conveyor device. Due to the operational subdivision of the overall conveying system into a first mechanical silo trailer conveyor device followed by a second ground milling machine conveyor device, as regarded in the direction of transportation of the bulk material, there is successfully obtained the spatial allocation of the transport of bulk material across the two main components of the work train accompanied by optimum transfer of the bulk material during operation.

The problem to be overcome when transferring bulk material by means of mechanical conveyor devices resides in the design of a conveying system which, unlike flexible pneumatic hoses, is composed of relatively rigid components, such that a loss-free, dust free, and quantitative delivery of bulk material is ensured during movement of the work train, more particularly, over uneven ground, slopes, or curves. The present invention solves this problem by designing the conveying system with two mechanical conveyor (sub)devices arranged in series, wherein the first mechanical conveyor device receives the bulk material from the discharge orifice of the storage container of the silo trailer and transports it via the silo trailer to the ground milling machine. The bulk material is deposited on a second mechanical conveyor device which is disposed on the ground milling machine and which thence finally transports the bulk material to the discharge equipment. Preferably, a transfer device exists between the first mechanical conveyor device and the second mechanical conveyor device, whose primary task lies in ensuring that the transfer of bulk material is as complete as possible. In order to make the delivery of bulk material between the two conveyor devices as loss-free as possible, the two said mechanical conveyor devices are, according to the present invention, advantageously disposed such that relative movements of the discharge orifice of the first mechanical conveyor device in relation to the inlet or the intake of bulk material of the second mechanical conveyor device are kept as small as possible or, at best, completely eliminated. Apart from a favorable relative arrangement of the conveyor devices, as will be described below in greater detail, the connection of the silo trailer to the ground milling machine plays a crucial role. This connection guarantees that the ground milling machine and the silo trailer are spaced from each other at a relatively constant distance. The silo trailer is, thus, attached to the ground milling machine and is drawn by the latter in operation with the simultaneous discharge of bulk material during milling.

The two mechanical conveyor devices are further advantageously designed such that they transport the bulk material while conveying it from the silo trailer to the ground milling machine not only in the horizontal direction but also partially upwardly in the vertical direction, thus, moving away from the underlying ground surface. This makes it possible to design the output equipment and/or the transfer device, for example, as a drop shaft, in which the bulk material falls from top to bottom. In this way, the transfer of bulk material, particularly between the two mechanical conveyor devices, can be easily carried out in a functionally reliable manner.

In particular, the ground milling machine may be provided with a lateral intermediate bunker, in which a volume of bulk material is kept for intermediate storage. This can be useful, for example, when it is desired to achieve a uniform discharge of bulk material in a simple manner. The intermediate bunker is ideally disposed such that it is filled by the second mechanical conveyor device and makes the bulk material available for discharge thereof at its opposite end. Additionally, or alternatively, metering equipment can be provided on the ground milling machine, more particularly, succeeding an intermediate bunker, for precise adjustment of the quantity of bulk material to be discharged per unit of time and/or unit of distance covered, as is well known in the prior art for this purpose.

Basically, it is possible to install the first mechanical conveyor device rigidly on the silo trailer. However, it is preferable for it to be detachably secured to the silo trailer or for it to be easily dismantled, in order to facilitate quick dismantling thereof. The first mechanical conveyor device can then be redeployed, for example, when there is a change of silo trailer, or for example, when it is to be transported with the ground milling machine during normal transportation, so that each individual silo trailer need not have a suitable first mechanical conveyor device. A readily detachable connection is, in particular, one that can be loosened by means of conventional tools, for example, impact screwdrivers, etc., and when it is possible to install and dismantle the mechanical conveyor device within a few minutes. The first mechanical conveyor device is arranged outside the storage container of the silo trailer. It is present on the silo trailer in addition to any conveyor system that may be arranged within the storage container for transporting bulk material inside the storage container.

However, the second mechanical conveyor device is advantageously rigidly mounted on the ground milling machine and is, thus, very preferably an integral component of this machine. Rigid assembly and permanent attachment of the second mechanical conveyor device to the ground milling machine make it possible to configure the latter in a particularly space-saving way, since it does not have to be accessible for optional installation or dismantling. By "rigid" is meant that the installation takes place on the ground milling machine such that no regular exchange or change of the entire conveyor device is required on the ground milling machine. Naturally, this does not mean that the conveyor device or parts thereof cannot in any way be dismantled, for example, for maintenance purposes.

In principle, both conveyor devices can have recourse to a plurality of mechanically operating transportation principles. A mechanical conveyor device is present in the sense of the present invention when it includes movable or moving parts, with which the bulk material stays in contact and the bulk material is transported thereby from the inlet of the mechanical conveyor device to the discharge orifice of the mechanical conveyor device due to movement of said parts. The bulk material can be at least partly surrounded by the moving parts, can rest thereon or be pushed thereby. Preferably, the mechanical conveyor devices have housing, in which the moving parts are at least partly mounted and which completely surrounds or encloses said parts except for the inlet and outlet of the conveyor device. A combination of different mechanical principles is also conceivable. However, pneumatic transport systems are explicitly not included. The present invention relates more particularly, to the use of scraper conveyors or belt conveyors. It is particularly preferred that at least one, and more particularly, both, of the conveyor devices include screw conveyors, or are designed as worm conveyors. Worm conveyors are characterized by efficiency and reliability, particularly during the transport of fine-grained or powdery bulk materials.

In order to increase the application flexibility, more particularly, regarding the silo trailer used, the latter has, in addition to the first mechanical conveyor device or appropriate connections for installing a first mechanical conveyor device, a spreading system, by means of which the bulk material can alternatively be spread directly from the silo trailer onto the underlying ground surface. Thus, the silo trailer of the present invention can be used even without the first mechanical conveyor device as a conventional silo trailer having a spreading function, for example, in conjunction with another tractor vehicle, if desired. When operated as a spreading vehicle, by means of which bulk materials are applied directly from the storage container of the silo trailer via the spreading system, the first mechanical conveyor device of the present invention is not necessary, which is why the latter is advantageously dismantled from the silo trailer prior to operation thereof as a spreading vehicle. Thus, with this embodiment, the silo trailer of the present invention fulfills a dual function as a pure silo trailer and as a combined spreading vehicle and silo trailer.

Preferably, there is present a control unit adapted to control at least the first mechanical conveyor device and the second mechanical conveyor device of the work train, particularly in a coordinated manner. The control unit can, for example, coordinate the conveying speeds of the two conveyor devices and tune them to each other depending on the operational situation. It is possible for the control unit both to control the two mechanical conveyor devices separately and independently of each other and to control them together. In particular, the control unit is, for example, designed such that it always operates the first mechanical conveyor device at a somewhat smaller conveying capacity than the second conveyor device that follows in the direction of delivery. In this way, an accumulation of bulk material in the region along the two conveyor devices is prevented. The control unit obtains the reference parameters necessary for control from a suitable sensor system comprising sensors for ascertaining different operating parameters from the ground milling machine and/or the silo trailer. Important measurable operating parameters are regarded as being the driving and operating speed of the ground milling machine, the conveying speed of one or both of the conveyor devices, the filling level of the storage container of the silo trailer, the filling level of a possibly used intermediate bunker of the output equipment and the metering rate of a possibly used metering unit in the output equipment, etc. By monitoring these operating parameters and appropriately controlling the work train, the assurance is given that in each phase of the operation the desired quantity of bulk material is supplied by the silo trailer and mixed into the underlying ground surface.

The silo trailer frequently carries a number of energy consumers such as, for example, the transporting and conveying systems (scraper floor, spreading system, first mechanical conveyor system, etc.). For power supply, provision is made for the silo trailer to be connectable via at least one connecting means to a power supply pertaining to the ground milling machine, more particularly, to a hydraulic system pertaining to the ground milling machine. In the most favorable case, the hydraulic system of the silo trailer and the hydraulic system of the ground milling machine are likewise coordinated, i.e., controlled, by the control unit. Thus, if there is an existing hydraulic connector, the silo trailer does not necessarily have an independent energy source, but is dependent on the energy of the hydraulic system of the ground milling machine for driving its transporting and conveying systems. Additionally, or alternatively, however, the silo trailer can also comprise a drive unit independently of the ground milling machine for the power supply of the silo trailer. Such a drive unit can be, for example, a diesel generating set or a battery. Via this drive unit, the transporting and conveying systems of the silo trailer and/or other consumers, e.g., sources of illumination, can be operated. Thus, the operation thereof takes place independently of the ground milling machine. However, a separate drive unit of the silo trailer is preferably likewise controlled by the control unit or coordinated with the drive motor of the ground milling machine. For example, it is of advantage to control the drive unit for the power supply of the silo trailer in such a way that it also starts when the drive motor of the ground milling machine is started.

It is basically necessary, for implementation of the concept of the present invention, to arrange that the silo trailer can in some way be coupled, for example, hitched, to the ground milling machine and can, thus, be entrained thereby when in operation. It is possible, for this purpose, to make use of known drawbar devices. However, it has been found that it is ideal, when the silo trailer has a transportation drawbar for transportation purposes and an operational drawbar, more particularly, separate from the transportation drawbar, for operational purposes, by means of which the silo trailer is hitched to the ground milling machine during operation of the work train for the purpose of incorporating bulk material into the underlying ground surface. The characteristic of this embodiment is, thus, that the silo trailer has two separate drawbar devices. The transportation drawbar advantageously corresponds to a conventional trailer drawbar, which is ideally either foldable towards the silo trailer or is telescopically retractable. This transportation drawbar is used whenever the silo trailer is transported between sites of operation of the work train or is otherwise not in operation. Unlike the transportation drawbar, the operational drawbar is designed such that it fulfills all operational requirements of the work train, that is to say, the operational drawbar is particularly adapted for operation of the work train. This means, in particular, that the operational drawbar is optimally designed to suit the special form of the conveying system for bulk material, more particularly, for the transport of bulk material from the silo trailer towards the ground milling machine. The optimization can take place, for example, in such a way that the operational drawbar is part of the transfer device and, thus, directly contributes towards a loss-free and dust-free transfer of bulk material from the silo trailer to the ground milling machine. Thus, more particularly, the operational drawbar connects the silo trailer to the ground milling machine only during operation of the work train.

It is advantageous when the operational drawbar mounted on the silo trailer is designed for movement between a working position for operational purposes, in which the silo trailer can be hitched to the ground milling machine via the operational drawbar, and a transportation position for transportation purposes. The working position of the operational drawbar is the position, in which it can establish a connection to, or hitch the silo trailer to, the ground milling machine. If it is desired to move the silo trailer between sites of work, however, the operational drawbar will then be moved to the transportation position, in which it will be shifted or swiveled towards the silo trailer, in order to create sufficient room for the transportation operation of the transportation drawbar and to enable the silo trailer to be coupled to a towing vehicle other than the relevant ground milling machine.

One aspect of the present invention lies not only in the design of the connecting devices on the silo trailer, but also in the relevant cooperating devices on the ground milling machine for establishing the drawing or towing link with the silo trailer. Basically, it is possible to resort to the coupling devices already known in the prior art. But the ground milling machine preferably includes a towing device that is provided especially for use with the operational drawbar. The silo trailer can, thus, be coupled via an operational drawbar to the towing device of the ground milling machine. The said towing device is ideally designed such that it has a substantially vertical articulation axis, about which the ground milling machine and the silo trailer can swivel relatively to each other during articulated maneuvers of the ground milling machine. In order to ensure a reliable transfer of bulk material from the silo trailer to the ground milling machine including with different articulated positions of the work train, provision is advantageously made for the bulk material to be at least partly guided along this axis of rotation or for the transfer device to be designed such that it extends at least partly along this articulation axis. Thus, for example, a shaft axis of a transfer device having a drop shaft, which is filled from above by the first mechanical conveyor device and is open at the bottom for the second mechanical conveyor device, is coaxial, preferably by way of its shaft axis, to the articulation axis, so that the relative shaft position between the end of the first mechanical conveyor device and the beginning of the second mechanical conveyor device remains virtually unchanged with different articulated positions. In this way, there is the assurance that the delivery of bulk material from the first mechanical conveyor device will always take place at the same point of the ground milling machine, regardless of the current articulated position of the work train. To this end, the towing device can in particular include, for example, a swivel joint with a vertical rotation or articulation axis, so that the trailer connection between the ground milling machine and the silo trailer can follow relative movements between these two elements of the work train.

It is further advantageous when the towing device has an orifice, more particularly, a horizontal orifice or one lying in a horizontal plane, through which the bulk material from the first conveyor device is transferred to the second conveyor device. The inner wall of this orifice is ideally part of a drop shaft through which the bulk material falls during the transfer of bulk material. Due to the design of the towing device having an orifice through which the bulk material can pass, it is possible to arrange the towing device at the same level on the ground milling machine as the transfer device. This successfully achieves, on the one hand, a space-saving design of the transfer and towing facilities and, on the other, a functional design thereof.

In practice, in addition to relative movements about the articulation axis between the ground milling machine and the silo trailer, there occur other relative movements, for example, due to surface irregularities. The towing device is advantageously configured such that it follows at least partly such relative movements, so as to make it possible, under conditions of maximum uniformity, to connect the silo trailer in a reliable manner and, ideally, at the same time to effect reliable delivery of bulk material. Thus, the towing device can have, for example, a setup which allows for a rocking movement about a pendulum axis, more particularly, about a horizontal axis of rotation extending in the direction of travel, i.e., straight forward. Such movements arise within the work train, for example, when the side levels of the underlying ground surface differ to various extents, for example, when driving through pot holes or similar irregularities with only one longitudinal side of the work train. Ideally, the aforesaid swivel joint adjustable about the articulation axis and a pendulum joint that can be swiveled about the pendulum axis are adapted in combination with one another, and it is particularly preferred when the pendulum axis and the articulation axis extend at right angles to each other. Furthermore, the swivel joint and the pendulum joint are advantageously designed such that their pivot axes intersect within a drop shaft between the first conveyor device and the second conveyor device, more particularly, directly on the shaft axis. This ensures that with a swiveling movement of the towing device about the articulation axis and/or the swivel axis, virtually the same conditions are maintained with regard to the delivery of bulk material.

The above effect can be further increased by providing, in addition to the mobility about the articulation axis and/or the pendulum axis, a further degree of freedom for the towing device, more particularly, consisting of adjustment about a tilt axis, more particularly, perpendicularly to the pendulum axis and to the articulation axis. The tilt axis describes relative movements of the silo trailer and the ground milling machine about a horizontal axis at right angles to the direction of travel, i.e., for example, when driving through depressions or over mounds. The towing device is designed such that the tilt axis ideally also intersects the articulation axis. The operational drawbar is, thus, advantageously swivel-mounted on the towing device about a swivel axis that extends substantially horizontally at right angles to the direction of travel.

In a specific embodiment, the towing device comprises a slewing bearing, which allows for mobility of the towing point for the silo trailer about the articulation axis, on the ground milling machine side. For the slewing ring the substantially circular design is of particular importance, since the ring-shaped interior thereof is part of the transfer device, that is to say, serves to permit transfer of bulk material to the ground milling machine. The slewing ring includes an attachment ring, via which it is connected to the ground milling machine, and a bearing ring adapted to rotate relatively to the attachment ring, for example, a holding ring adapted to move over a rolling contact bearing for rotation relatively to the ground milling machine and serving at least partly as connection point for the silo trailer. The towing device includes additionally, or alternatively, a bearing swing and/or a rocker bearing, which provides mobility to the towing point for the silo trailer about the pendulum axis. The bearing swing is, in particular, also the supporting structure for the slewing ring, more particularly, for its bearing element. The towing device includes, preferably additionally, or alternatively, a hitching device, for example, implemented as holding bearings, which impart mobility to the towing point for the silo trailer about the tilt axis. These are very preferably bearing pin snap-in receivers, in particular locking latches, which are fixedly mounted on the bearing element, into which receivers there snap appropriate bearing pins on a bulk material shaft on the silo trailer side.

In order to ensure optimum leak tightness, more particularly, in the region between the end of the first mechanical conveyor device and the beginning of the second mechanical conveyor device, that is to say, across the transfer device, the latter preferably includes at least one flexible dust sleeve. In particular, said sleeve rests sealingly against the bearing ring of the towing device, the bulk material being moved through the bearing ring onto the second mechanical conveyor device. The dust sleeve may consist, for example, of a flexible plastics material or a fabric material. It is placed around the discharge orifice of the transfer device so as to guide the bulk material into the orifice of the towing device. The dust sleeve is, thus, for example, a flexible hose element that has the same diameter as the transfer device and the orifice of the towing device, that is to say, the bearing ring. However, the diameter of the dust sleeve is preferably smaller than that of the bearing ring such that the sleeve can be pushed into the inside of the bearing ring, laterally sealing it like a plug. Apart from specific diameter ratios, the function of the dust sleeve is to provide appropriate flexible sealing of the delivery channel through the towing device in relation to the external environment.

The object is likewise successfully achieved by means of a towing device for coupling a silo trailer by means of an operational drawbar to a ground milling machine, more particularly, as described for the aforementioned work train, and for the delivery of bulk material from a first mechanical conveyor device mounted on the silo trailer onto a second mechanical conveyor device mounted on the ground milling machine, comprising at least one towing element on the operational drawbar for coupling the silo trailer to the ground milling machine. On the ground milling machine side, the towing device preferably comprises a bearing ring with an orifice, through which the bulk material is transported from the first mechanical conveyor device through the towing device to the second mechanical conveyor device, wherein the bearing ring can be rotated about an axis of rotation at right angles to the direction of travel and about a pendulum axis at right angles to said axis of rotation, wherein the operational drawbar of the silo trailer and the bearing ring of the towing device can be connected such that the silo trailer and the ground milling machine can be moved relatively to each other when traveling over an uneven ground surface, about a swivel axis extending at right angles to the direction of travel, while the axis of rotation intersects both the pendulum axis and the swivel axis. A towing device designed in this manner has all the advantages described above. For further details, reference is made to the above description concerning the work train according to the present invention.

Finally, the object can also be successfully achieved by means of a connecting mechanism, more particularly, a towing device according to the above description, for the transfer of bulk material between two elements moving relatively to each other about at least one axis of rotation, wherein the elements movable relatively to each other are a silo trailer and a ground milling machine, which connecting mechanism in each case comprises a coupling element on one of the two relatively moving elements that are designed for coupling with one another, particularly in the form of elements of the above towing device for achieving said towing connection. It is an object of the present invention that a so-called rotary passage is present as part of the connecting mechanism. This passage extends at least partly along the axis of rotation and provides a delivery route for the bulk material extending from one element to the other. The rotary passage, thus, extends along the axis of rotation, so that the bulk material that is to be transferred between the two elements is at least partly transported along the axis of rotation. Thus, the advantage gained for practical use is that for the bulk material substantially the same route of transportation is retained for the guidance of material through the connecting mechanism and, thus, for example, for different relative positions of the two elements, e.g., articulated positions of the silo trailer in relation to the ground milling machine, an individual adjustment of the guidance of the bulk material is not necessary. In other words, adjustment takes place automatically via a rotating movement of at least one part of the rotary passage about the axis of rotation. The connecting mechanism is specifically designed in the form of the above described towing device, to which reference is expressly made with regard to preferred embodiments of the connecting mechanism of the present invention.

BRIEF DESCRIPTION OF THE DRAWINGS

The present invention is described in more detail below with reference to the exemplary embodiment shown in the figures, in which:

FIG. 5 is a diagrammatic side view of the towing device as shown in FIGS. 1 and 2;

FIG. 6 is a diagrammatic perspective top view of the towing device as shown in FIG. 5.

DETAILED DESCRIPTION OF THE INVENTION

Like components and functionally similar components are designated in the figures by the same reference symbols and components recurring in the figures are not separately marked in each figure.

Figure 1:
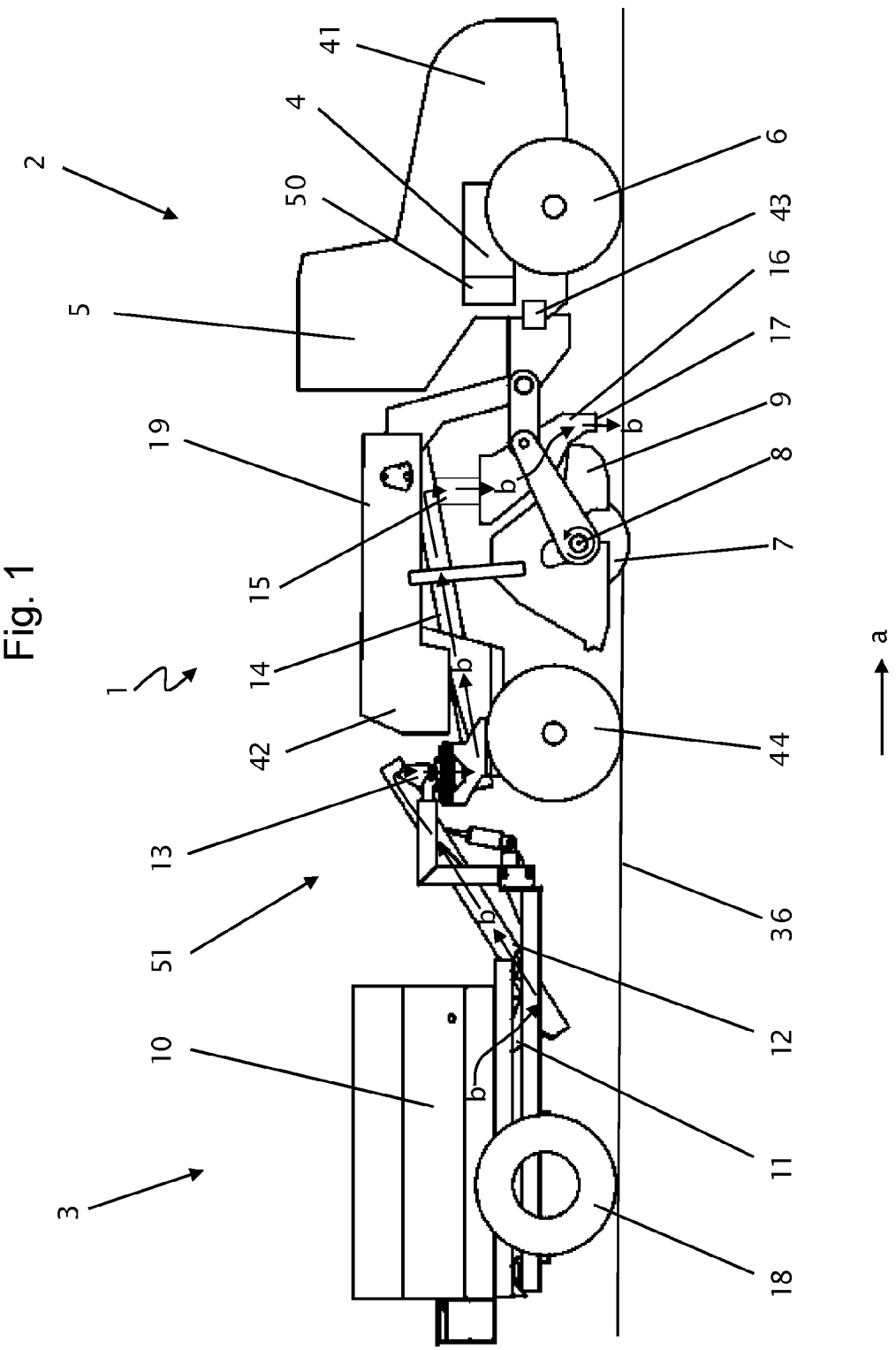
FIG. 1 is a diagrammatic side view of a work train comprising a ground milling machine and a silo trailer.

FIG. 1 shows a work train 1 comprising a self-propelled ground milling machine 2 and a silo trailer 3 drawn by the ground milling machine 2. The generic ground milling machine 2 has a chassis 19 comprising a front frame 41 and a rear frame 42 connected thereto via an articulated joint 43, a drive motor 4, a hydraulic system 50, an operator's platform 5, front wheels 6 on the front frame 41 and axle-steered rear wheels 44 on the rear frame 42. Further, the ground milling machine 2 includes a milling drum 7 which is disposed in a milling drum hood 9 and which can be rotated about a milling drum axis 8. The milling drum 7 serves to mill the ground surface 36 in the direction of travel 'a'.

In the exemplary embodiment shown, the generic silo trailer 3 is single-axle, but there may alternatively be used multi-axle silo trailers or even self-propelled silo trailers or spreading vehicles. It comprises wheels 18, a storage container 10 and a silo outlet 11. Within the storage container, there is also disposed at least one further conveying system 45, such as a scraper floor, via which the bulk material can be conveyed within the storage container 10 to the silo outlet 11.

A characteristic of the said work train 1 is a conveying system 51 comprising two independent conveyor devices arranged in series one behind the other as regarded in the direction of travel, and by means of which the bulk material can be conveyed from the silo outlet 11 and delivered to a discharge orifice on the ground milling machine 2. The delivery route of the conveying system 51 is, thus, situated completely outside the storage container 10 of the silo trailer 3. This delivery route is indicated in FIG. 1 by the arrows b. For the purpose of delivering bulk material from the silo outlet 11 of the storage container 10, there is provided a first mechanical conveyor device 12. The latter transports bulk material from the silo outlet 11 of the trailer to a transfer device 13. Using this transfer device 13, which is disposed between the silo trailer 3 and the ground milling machine 2 and is designed substantially as a vertical drop shaft, the bulk material is delivered to the second mechanical conveyor device 14, which transports the bulk material up to the discharge orifice 15 and delivers it to output means 16 comprising a repository orifice 17, via which the bulk material is deposited on the underlying ground surface 36, as regarded in the direction of travel 'a', in front of the milling drum 7. In the simplest case, the transfer device 13 consists merely of a throw-off from the first mechanical conveyor device 12. It can alternatively be designed as a tube, a shaft, or a flexible sleeve in the form of a downpipe. A further mechanical transfer of the bulk material employing a further mechanical conveyor device can likewise be used between the first mechanical conveyor device 12 and the second mechanical conveyor device 14. In this exemplary embodiment, the transfer device 13 is a short tubular shaft element, which guides the bulk material from the throw-off of the first mechanical conveyor device 12 downwardly towards the bulk material receiver of the second mechanical conveyor device 14.

Figure 2:
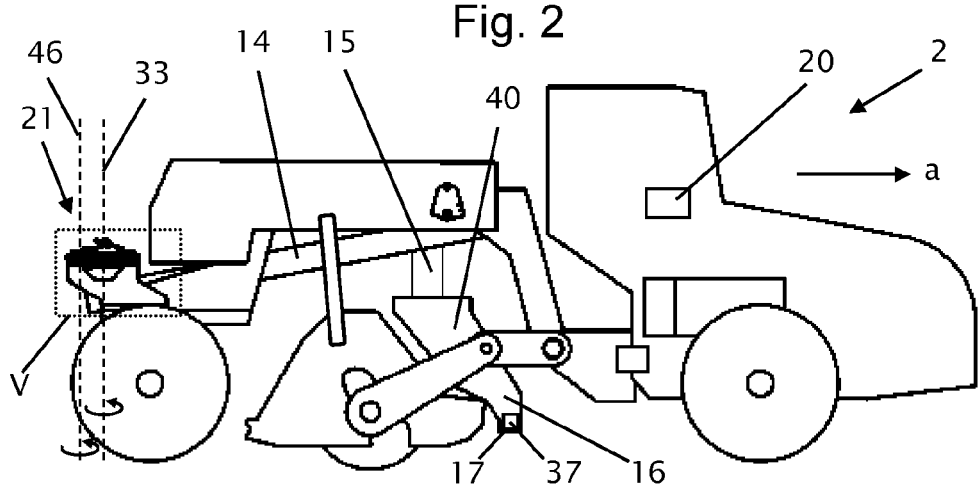
FIG. 2 is a diagrammatic side view of the ground milling machine as shown in FIG. 1.

Further details of the ground milling machine 2 are shown in FIG. 2. In the rear part of the ground milling machine, a towing device 21 is disposed on the chassis and serves the purpose of coupling the silo trailer 3 during operation. An important feature is that this towing device 21 is partly simultaneously directly involved in the delivery of bulk material from the silo trailer 3 to the ground milling machine 2, as is explained in detail below.

In the present embodiment, the ground milling machine 2 further comprises a control unit 20. The control unit 20 serves to control transfer of the bulk material from the silo trailer 3 to the ground milling machine 2 and, to this end, monitors and controls various operational parameters. This relates, more particularly, to the conveying rate or at least to the conveying operation of the first mechanical conveyor device 12 and the second mechanical conveyor device 14. For controlled and continuous bulk material discharge, there is further provided an intermediate bunker 40 with the present exemplary embodiment as part of the output means 16, which bunker serves the purpose of stocking bulk material on an interim basis directly ahead of the metering equipment 37. The intermediate bunker 40 makes it possible, for example, to achieve a uniform discharge of bulk material without permanently transferring bulk material from the silo trailer 3 via the mechanical conveyor devices 12 and 14. Rather, provision is made for the level of bulk material in the intermediate bunker to fluctuate regularly between a maximum and a minimum value and, depending on which of these extreme filling levels is being reached, for the respective first or second mechanical conveyor or transport device to be activated or switched off as required. This considerably facilitates the control of the transfer of bulk material.

The metering equipment 37, which is likewise controlled by the control unit 20, is designed as a rotary feeder and delivers a certain quantity of bulk material per unit of time from the intermediate bunker 40 onto the underlying ground surface 36. As already described, the intermediate bunker 40 is supplied with bulk material either continuously or periodically via the conveying system 51. As an alternative to an embodiment comprising an intermediate bunker 40 and metering equipment 37, the output means 16 can merely be a drop shaft, through which the bulk material drops substantially freely directly from the discharge orifice of the second mechanical conveyor device to the ground surface below.

Of central importance for the present embodiment of the work train 1, is the design of the towing device 21. This has a substantially vertical articulation axis 33, about which it is possible for the ground milling machine 2 to move relatively to the silo trailer 3, for example, when the work train 1 starts and completes traveling through a curve. This towing device 21 serves the purpose of towing the silo trailer 3 during operation of the work train 1, during which process the bulk material is transferred, delivered and worked into the underlying ground surface. In the case of pure transportation, when the work train 1 travels, for example, over relatively long distances from a filling site to the place of work, it is possible, however, to couple the silo trailer 3 by a conventional trailer coupling to a conventional towing vehicle, e.g., a tractor. Even when it is in principle preferable for coupling of the silo trailer 3 to the ground milling machine 2 to take place alone via the special drawbar 24, that is, the towing device 21, it is still alternatively possible to design the ground milling machine 2 such that both towing options can be resorted to. In this regard, the reference symbol 46 denotes the axis of rotation, i.e., the articulation axis, between the ground milling machine 2 and the silo trailer 3 when connected by a conventional trailer coupling by means of a conventional transportation drawbar. In the present embodiment, the two articulation axes 33 and 46 do not extend coaxially to each other.

Figure 3:
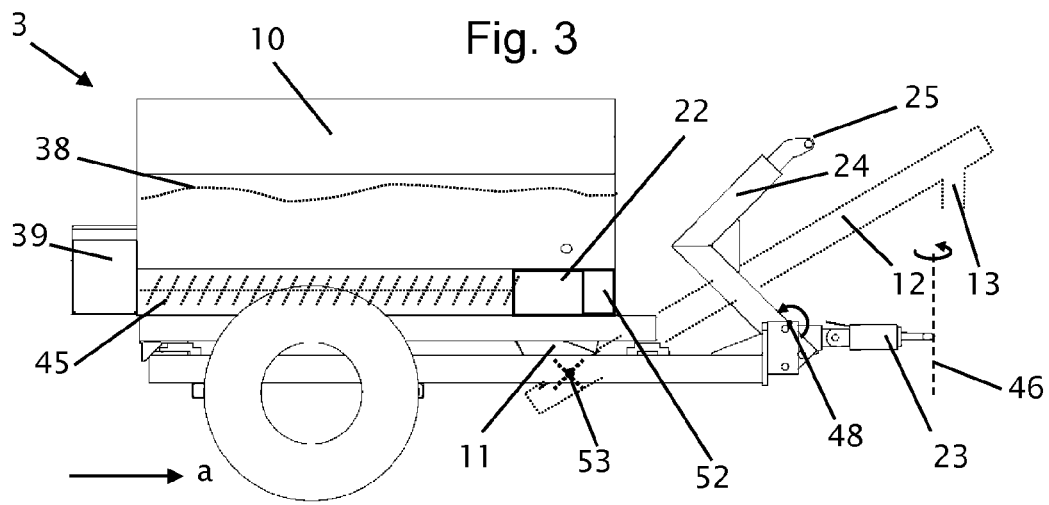
FIG. 3 is a diagrammatic side view of the silo trailer as shown in FIG. 1 with the operational drawbar and transportation drawbar in the transportation position.
Figure 4:
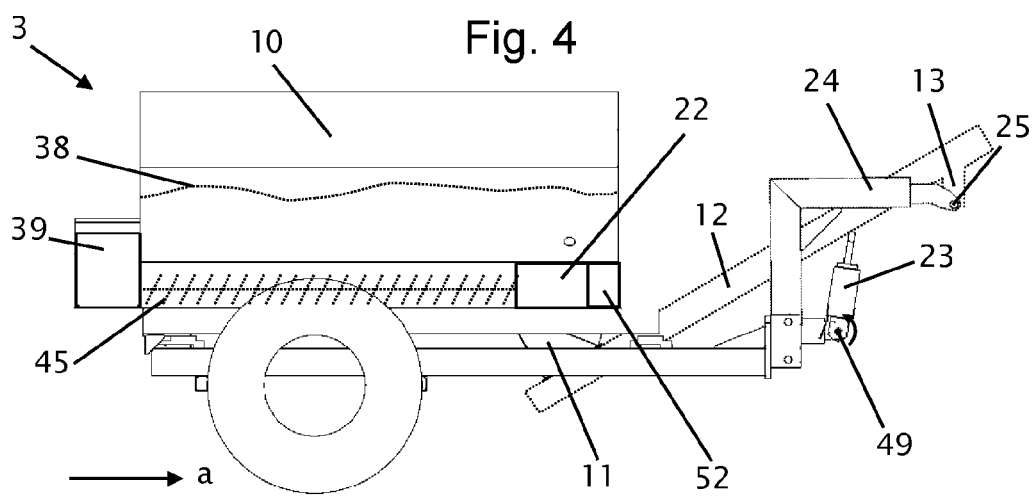
FIG. 4 is a diagrammatic side view of the silo trailer as shown in FIG. 3 with the operational drawbar and the transportation drawbar in the working position.

FIGS. 3 and 4 show further details of the silo trailer 3. The storage container 10 is filled with bulk material 38, whose top surface is shown dotted. At the tail of the silo trailer 3, there is disposed a spreading device 39, to which the bulk material 38 can be supplied by way of the scraper floor 45. The present silo trailer can, thus, be alternatively used as an independent spreading unit, for example, in conjunction with a conventional traction engine. The scraper floor 45 can likewise be used for transporting bulk material 38 to the silo outlet 11. The scraper floor 45 and optionally the first mechanical conveyor device 12, as well as the spreading device 39, are driven, i.e., supplied with energy, by the driving component 22 of the silo trailer. Alternatively, a connection to the hydraulic system 50 of the ground milling machine 2 for power supply to the silo trailer 3 can be established via the connecting means 52, which then drives the other devices of the silo trailer 3. The first mechanical conveyor device 12 and the transfer device 13 are designed as attachments to the silo trailer 3 and are accordingly shown dotted. By the use of appropriate attachment systems, for example, rapid fasteners, it is possible to achieve regular and fast installation and dismantling of these elements on the silo trailer 3. It is, of course, also possible for these elements to be firmly installed on the silo trailer. During operation for the delivery of bulk material to the ground milling machine, the scraper floor 45 conveys the bulk material from the storage container to the silo outlet 11 in a manner known per se. The bulk material then passes a paddle 53, shown only in FIG. 3, which is substantially a homogenization mechanism for standardization of the bulk material. In the present embodiment, the paddle 53 revolves about a horizontal axis transversely to the direction of travel 'a' and has a plurality of mixing and comminuting fingers that protrude radially along the axis of rotation to interrupt the flow of bulk material in a rotary fashion. The bulk material is subsequently received by the first mechanical conveyor device, specifically the screw conveyer, and transported by the latter towards the ground milling machine.

Furthermore, it is characteristic of the present silo trailer for it to have simultaneously two separate towing brackets, an operational drawbar 24 and a transportation drawbar 23, by means of which it is possible to couple the trailer to a traction engine, the operational drawbar 24 being, more particularly, adapted as a connecting mechanism to link it to the ground milling machine 2. The operational drawbar, thus, represents specifically the connecting mechanism between the two elements silo trailer and ground milling machine. The two drawbars 23 and 24 can be moved relatively to the frame structure of the silo trailer 3. FIG. 3 shows the transportation position of the transportation drawbar 23. The operational drawbar 24 has been swiveled about the axis of rotation 48 to the rear towards the storage container 10 away from the coupling area. By contrast, in FIG. 4 the drawbars are disposed in working position, the operational drawbar 24 has been folded away from the storage container 10 about the axis of rotation 48 and the transportation drawbar 23 has been turned about the axis of rotation 49 towards the storage container 10. Alternatively, a telescopic arrangement can be used, for example. In this position, the operational drawbar 24 can be attached to the towing device 21 by means of trailer pins 25, which extend horizontally and transversely to the direction of travel 'a'.

Details regarding the towing device 21 are particularly visible in FIGS. 5 and 6. FIG. 5 shows a detailed view taken along the line V shown in FIG. 2. In all, the towing device 21 is secured to the chassis 19 of the ground milling machine 2 by means of a fastening device 28. The fastening device 28 comprises two bearing brackets, which are interconnected by means of transverse bars. The bearing brackets and the transverse bars form a supporting structure connected firmly to the chassis of the ground milling machine 2, on which a bearing ring 32 is mounted via pendulum joints 29. The pendulum joints 29 are designed specifically on the mounting plates protruding from the transverse bars and enable an oscillating movement of the bearing ring 32 to take place relatively to the supporting structure and, thus, relatively to the chassis 19 of the ground milling machine 2 about the pendulum axis 34 extending in the direction of travel 'a' of the work train 1. The bearing ring 32 is, thus, designed as a type of swinging or rocking bearing. The bearing ring 32 in turn serves as a bearing element for a bearing or slewing ring 27. This is swivel-mounted on the bearing ring 32 via a swivel joint 31 about the vertical articulation axis 33. Further, this slewing ring 27 comprises a bearing pin snap-in receiver arranged as locking latch 26 on both longitudinal sides aligned at right angles to the direction of travel 'a' during a straight ahead drive of the work train 1, which locking latches 26 specifically serve to accommodate the trailer pins 25 of the operational drawbar 24. In the condition as mounted in the locking latches 26, this connection imparts mobility to the ground milling machine 2 relatively to the silo trailer 3 about a tilt axis 47, which extends horizontally and at right angles to the direction of travel 'a'. The special design of the towing device 21 is an articulated unit, which makes it possible for the silo trailer 3 coupled to the ground milling machine 2 by means of the towing device 21 to move within a certain area in all three directions of space, so that, in particular, while transiting uneven ground, a reliable coupling is ensured, on the one hand, and, as explained in greater detail below, a uniform transfer of bulk material from the silo trailer 3 to the ground milling machine 2 is made possible during operation, on the other.

Apart from the pure coupling function, the towing device 21 fulfills a routing function for the bulk-material. This is manifested by the fact that the bulk material 38 passes directly through the towing device 21 during the transfer of bulk material. At the center of the slewing ring 27, the swivel joint 31, and the bearing ring 32 there is disposed the orifice 30 for bulk material 38 coming from the first mechanical conveyor device 12. During the transfer between the two mechanical conveyor devices 12 and 14, the bulk material 38, thus, also passes through the towing device 21 along the articulation axis 33 and intersects, in the present case in succession, the tilt axis 47 and the pendulum axis 34, both of which are horizontal. In all, the towing device 21, thus, enables adjustment of the movements of the ground milling machine 2 in relation to the silo trailer 3 about the articulation axis 33, the pendulum axis 34, and the tilt axis 47. The bulk material 38 is guided through the orifice 30 of the towing device 21 on its way from the transfer device 13 to the second mechanical conveyor device 14. By arranging for the delivery of the bulk material 38 from the first mechanical conveyor device 12 to the second mechanical conveyor device 14 to take place at least partly along the vertical articulation axis 33 and due to the compensating mobility of the towing device 21 or the towing coupling 26 in relation to the operational drawbar 24, it is ensured that the bulk material 38 is delivered without problems under much the same relative conditions with each position of the ground milling machine 2 relative to the silo trailer 3 that occurs in operation.

Figure 7:
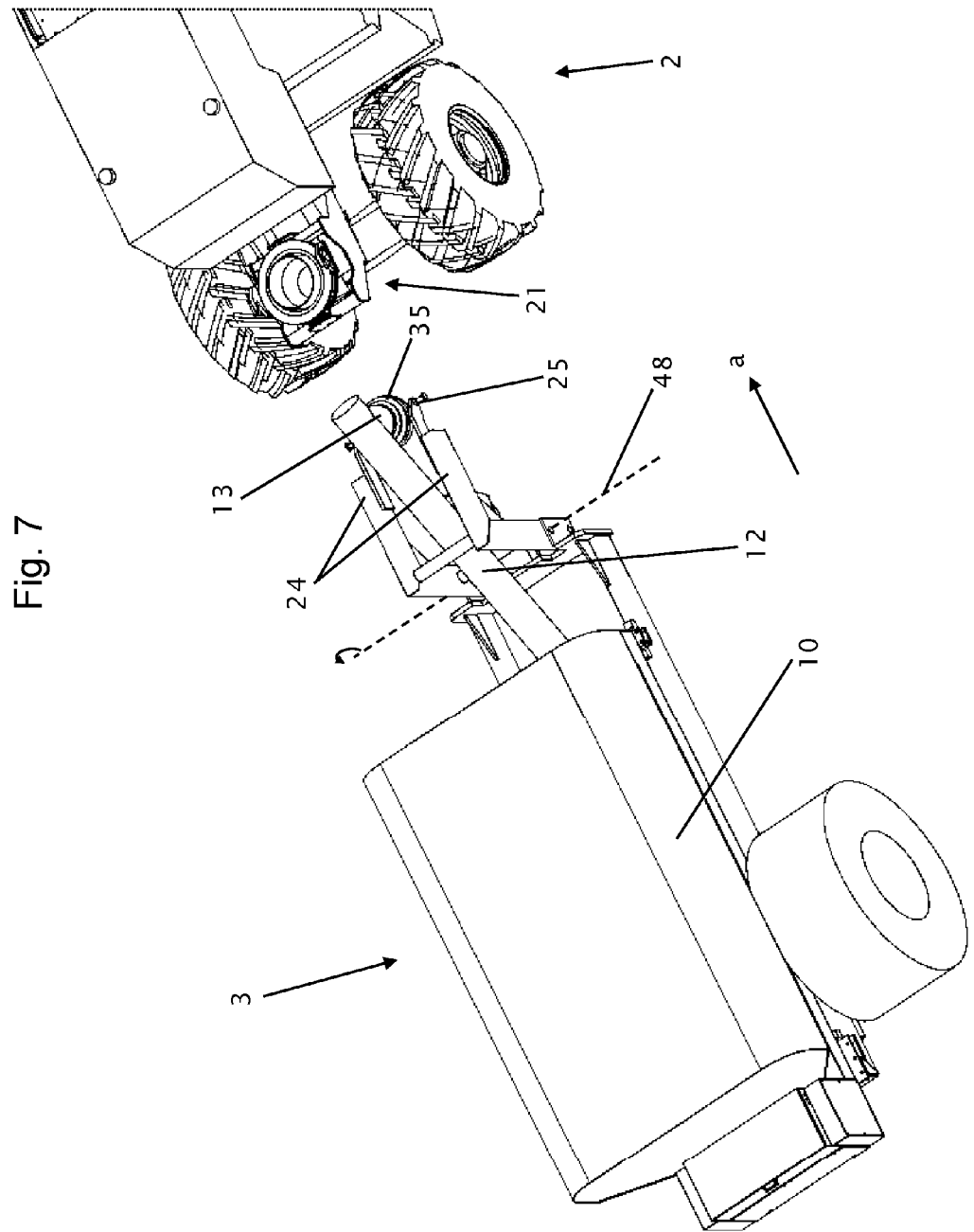
FIG. 7 is a diagrammatic perspective top view of a ground milling machine and an uncoupled silo trailer.

FIG. 7 shows a perspective top view of the rear of a ground milling machine 2 with an uncoupled silo trailer 3 and clarifies the details of the transfer device 13. The first mechanical conveyor device 12, comprising a tubular housing and a screw conveyor contained therein, terminates in the delivery direction in the transfer device 13, which is vertically downwardly open towards the orifice 30 in the towing device 21. In order to make the transfer of bulk material as dust-free as possible, a spout-shaped dust sleeve 35 is provided, which, when the silo trailer 3 is mounted in the towing device 21, fits as part of the transfer device 13 tightly on the circular surface of the slewing ring 27. Of course the specific design of the dust sleeve 35 can vary, if desired. What is essential in this regard is to preserve the sealing function in this region. The dust sleeve 35 consists of flexible material and adapts to all relative movements between the slewing ring 27 and the transfer device 13 in a compensating manner. Thus, leakages are well avoided during the transfer of the bulk material 38 from the first mechanical conveyor device 12 to the second mechanical conveyor device 14.

While the present invention has been illustrated by description of various embodiments and while those embodiments have been described in considerable detail, it is not the intention of Applicants to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicant's invention.

What is claimed is:

1. A work train for discharging bulk material and incorporating the same in an underlying ground surface, comprising:
    a self-propelled ground milling machine comprising a milling drum and a drive motor,
    a silo trailer drawn by said ground milling machine and comprising a storage container for bulk material, wherein a first conveying system is provided inside said storage container for conveying the bulk material within the storage container to a silo outlet,
    a second conveying system arranged outside the storage container of the silo trailer which transports bulk material, during operation of the work train, from said silo trailer in the direction of travel (a) of the ground milling machine up to said milling drum, and
    an output device which discharges the bulk material onto the ground in front of the milling drum with respect to the direction of travel (a),
    wherein said second conveying system comprises a first mechanical conveyor device and a second mechanical conveyor device which are arranged in series, wherein the bulk material is transported by the first mechanical conveyor device mounted on the silo trailer from the storage container to the second mechanical conveyor device mounted on said ground milling machine and thereafter to said output device on said ground milling machine.

2. The work train according to claim 1, wherein a transfer device is provided which guides the bulk material from the end of said first mechanical conveyor device to the beginning of said second mechanical conveyor device.

3. The work train according to preceding claim 1, wherein said first mechanical conveyor device is releasably mounted on said silo trailer.

4. The work train according to claim 1, wherein said second mechanical conveyor device is immovably disposed on the ground milling machine.

5. The work train according to claim 1, wherein at least one the first and second mechanical conveyor devices is a screw conveyor.

6. The work train according to claim 1, wherein a control unit is provided which is adapted to effect coordinated control of the first mechanical conveyor device and the second mechanical conveyor device.

7. The work train according to claim 1, wherein the silo trailer comprises a spreading device configured to alternatively directly spread bulk material from the silo trailer onto the ground surface.

8. The work train according to claim 1, wherein said ground milling machine comprises a hydraulic system, and the silo trailer is capable of being connected via a connecting device to said hydraulic system of said ground milling machine.

9. The work train according to claim 1, wherein said silo trailer comprises a driving component that is independent of a drive motor of said ground milling machine for supply of energy to said silo trailer.

10. The work train according to claim 1, wherein said silo trailer comprises a transportation drawbar for a transport operation and an operational drawbar configured to attach the silo trailer to the ground milling machine under working conditions of said work train for the purpose of working bulk material into said underlying ground surface.

11. The work train according to claim 10, wherein said operational drawbar mounted on said silo trailer can be moved between a working position for a working operation, in which said silo trailer is capable of being hitched onto the ground milling machine via said operational drawbar, and a transportation position for said transport operation.

12. The work train according to claim 2, wherein a towing device disposed on said ground milling machine is provided via which said silo trailer is capable of being coupled to said ground milling machine and movable about an articulation axis, and that said transfer device is configured such that it extends at least partially along said articulation axis.

13. The work train according to claim 12, wherein said towing device has a substantially horizontal orifice forming part of the transfer device.

14. The work train according to claim 12, wherein said towing device comprises a swivel joint for rotation about the articulation axis and a pendulum joint for rotation about a pendulum axis extending at right angles to the articulation axis.

15. The work train according to claim 14, wherein said silo trailer comprises a transportation drawbar for a transport operation and an operational drawbar configured to attach the silo trailer to the ground milling machine under working conditions of said work train for the purpose of working bulk material into said underlying ground surface.

16. The work train according to claim 15, wherein said towing device and said operational drawbar together form a tilt joint having a tilt axis that is horizontal and at right angles to the direction of travel (a).

17. The work train according to claim 16, wherein said towing device comprises a bearing ring having a rocker bearing that is capable of moving about said pendulum axis, and having a slewing ring with holding bearings, which is disposed on said rocker bearing and is rotatable about said articulation axis, which holding bearings are adapted to accommodate said silo trailer rotatably about said tilt axis.

18. A towing device for a work train according to claim 1, for coupling said silo trailer having an operational drawbar to said ground milling machine and for transferring bulk material from a first mechanical conveyor device mounted on said silo trailer to a second mechanical conveyor device mounted on said ground milling machine, comprising:
    at least one hitching device for coupling the silo trailer; and
    a horizontal, annular slewing ring having an orifice, through which the bulk material is transferred from said first mechanical conveyor device through the towing device to said second mechanical conveyor device,
    wherein said slewing ring is mounted so as to be able to rotate about an articulation axis at right angles to the direction of travel (a) and to perform pendular motion about a pendulum axis at right angles to said articulation axis, and wherein said operational drawbar of said silo trailer is movable relative to said hitching device of said towing device about a tilt axis extending at right angles to the direction of travel (a), and further wherein the vertical articulation axis intersects both the pendulum axis and the tilt axis.

19. A towing device according to claim 18, for the transfer of bulk material between said silo trailer and said ground milling machine which are movable relative to each other about at least one axis of rotation, and wherein said towing device comprises a coupling element on one of said silo trailer or said ground milling machine, and that a rotary passage is provided which extends at least partially along the axis of rotation and through which bulk material can move from one of the said silo trailer or said ground milling machine to the other.

20. The work train according to claim 1, wherein said ground milling machine comprises one of a recycler or a stabilizer.

21. The work train according to claim 2, wherein said transfer device comprises a drop shaft.

* * * * *